(12) United States Patent
Beck

(10) Patent No.: US 7,568,562 B2
(45) Date of Patent: Aug. 4, 2009

(54) SELF-PUMPING HYDROPNEUMATIC SPRING STRUT

(75) Inventor: Hubert Beck, Eitorf (DE)

(73) Assignee: ZF Friedrichshafen AG, Friedrichshafen (DE)

(*) Notice: Subject to any disclaimer, the term of this patent is extended or adjusted under 35 U.S.C. 154(b) by 227 days.

(21) Appl. No.: 11/492,420

(22) Filed: Jul. 25, 2006

(65) Prior Publication Data

US 2007/0175718 A1 Aug. 2, 2007

(30) Foreign Application Priority Data

Jul. 26, 2005 (DE) ............ 10 2005 034 779
Jun. 2, 2006 (DE) ............ 10 2006 025 826

(51) Int. Cl.
 B60G 17/00 (2006.01)
 F16F 9/34 (2006.01)
(52) U.S. Cl. ............ 188/313; 267/64.17; 267/217
(58) Field of Classification Search ........ 267/217, 267/218, 64.19, 64.17; 188/316, 317, 289, 188/313–315, 322.13; 280/6.159
See application file for complete search history.

(56) References Cited

U.S. PATENT DOCUMENTS 3,610,656 A * 10/1971 Klees ............ 280/6.159
5,062,616 A 11/1991 Sommer
5,941,508 A 8/1999 Murata et al.
6,092,816 A * 7/2000 Sekine et al. ............ 280/6.159
6,220,584 B1 * 4/2001 Meyer ............ 267/140.13
6,871,845 B2 * 3/2005 Beck ............ 267/64.17

FOREIGN PATENT DOCUMENTS

DE 196 48 859 5/1998

* cited by examiner

Primary Examiner—Melody M Burch
(74) Attorney, Agent, or Firm—Cohen Pontani Lieberman & Pavane LLP

(57) ABSTRACT

A self-pumping hydropneumatic spring strut includes an oil-filled working cylinder which is divided into two working spaces by a working piston carried by a hollow piston rod. Two high-pressure chambers connectable to the cylinder in such that the piston rod is selectively supported in both directions of movement either on a gas cushion provided by the first high-pressure chamber, the second high-pressure chamber, or both high-pressure chambers. Further, the spring strut includes a piston pump driven by the movements of the piston rod and for conveying oil from a low-pressure chamber to the working space which is connected to at least one of the high-pressure chambers. Moreover, a control channel connects the working space, which is connected to at least one of the high-pressure chambers, to the low-pressure chamber via a control opening, which can be closed as a function of the position of the working piston in the working cylinder.

12 Claims, 4 Drawing Sheets

SELF-PUMPING HYDROPNEUMATIC SPRING STRUT

BACKGROUND OF THE INVENTION

The invention pertains to a self-pumping hydropneumatic spring strut with internal level control, in particular used for motor vehicles.

Such spring struts may comprise an oil-filled working cylinder divided into two working spaces by a working piston carried by a hollow piston rod, wherein one working space is connected to a high-pressure chamber and the piston rod is supported against the gas cushion in that high-pressure chamber, which acts as a spring. Further, the spring strut may comprise a piston pump driven by the movements of the piston rod, thus conveying oil from a low-pressure chamber to the working space connected to the high-pressure chamber. The piston pump includes a cylinder formed by the hollow piston rod and a hollow pump rod attached to the working cylinder and carrying a suction valve at its forward end. The pump rod fits into the piston pump cylinder and the bore of the pump rod is connected to the low-pressure chamber. The spring strut further may comprise a control opening, which can be closed as a function of the position of the working piston in the working cylinder, and which connects the working space connected to the high-pressure chamber to a control channel opening out into the low-pressure chamber.

Self-pumping spring struts with internal level control are already known (e.g., DE 196 48 859 C2), in which the piston rod is pushed outward during the operation of the vehicle until it reaches a certain position, and in which a control opening is released to limit the height of the vehicle. At this moment, the control function begins, in that the oil flows via the control opening back to the low-pressure space from the working cylinder under high pressure. The high-pressure space consists of an area filled with oil and a gas cushion, which is sealed off from the oil. Because the spring characteristic curve is slightly progressive because of the high-pressure gas cushion, this system reduces undesirable rocking movements of the vehicle body as the vehicle passes around a curve or during an abrupt change of lanes and in similar driving situations. This undesirable rocking movement also occurs to an increased extent in vehicles which have a relatively high center of gravity. In these vehicles, the problem of rocking is unavoidable.

Self-pumping spring struts are also known (U.S. Pat. Nos. 5,062,616, 5,941,508), in which a second high-pressure chamber is provided in series with the first high-pressure chamber. This second high-pressure chamber can be filled by the movements of the piston rod acting via the piston pump, but an appropriate arrangement of check valves prevents the second high-pressure chamber from emptying itself independently. Through actuation of an appropriate valve, the second high-pressure chamber can be emptied, so that this device can be used for level control, in which the vehicle, which was loaded while stopped, can then be brought up to level. This design does not make it possible to produce different spring characteristic curves.

SUMMARY OF THE INVENTION

It is an object of the present invention to create a self-pumping hydropneumatic spring strut with internal level control, in which the undesirable rocking movement of a vehicle, especially of a vehicle with a tall body, can be counteracted.

According to a first preferred embodiment of the present invention, through the use of two parallel high-pressure chambers, an appropriate part of the overall high-pressure gas cushion can be briefly disconnected when necessary, so that it has no effect on the practical spring action of the strut. The part of the high-pressure gas cushion which is still active produces a much steeper spring characteristic curve, which therefore also provides a more stabilizing effect on the vehicle.

It is also advantageous that, through the use of two high-pressure chambers which can be separated from each other, the spring strut offers two different spring characteristic curves, which can be applied even during operation of the vehicle. If the entire high-pressure volume is active, the piston rod is elastically supported against the entire gas spring volume, and the damping characteristic curves are thus flatter, which means a more comfortable ride.

When one of the gas spring volumes is cut off, the damping force characteristic curves are steeper, and the chassis of the vehicle acquires a sports car-like, harder type of behavior.

By connecting and cutting off one of the two high-pressure chambers, furthermore, it is also possible to stabilize the vehicle against rocking, in that the steeper damping force characteristic curve can be activated briefly, only when actually needed.

According to an aspect of the invention, a shut-off valve is provided between the first high-pressure chamber and the second high-pressure chamber.

In an embodiment which is favorable from a fabrication standpoint, a shut-off valve is provided between the upper working space and the second high-pressure chamber. It is advantageous for the shut-off valve to be controllable externally.

According to another aspect of the invention, the gas cushion is separated from the oil in the first and the second high-pressure chamber.

To obtain an electronically controlled overall system, the shut-off valve is actuated and switched electronically in the area of the extension of the spring strut defining the dynamic level height of the vehicle, or at one of the reversal points. It is advantageous for the actuation to occur in the tension and/or compression stage.

The gas cushions of the first and second high-pressure chambers, furthermore, are of different size. This makes it possible to obtain various types of spring characteristic curves.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred exemplary embodiments of the invention are illustrated in greater detail in the drawings.

DETAILED DESCRIPTION OF THE PREFERRED EMBODIMENTS

Figure 1:
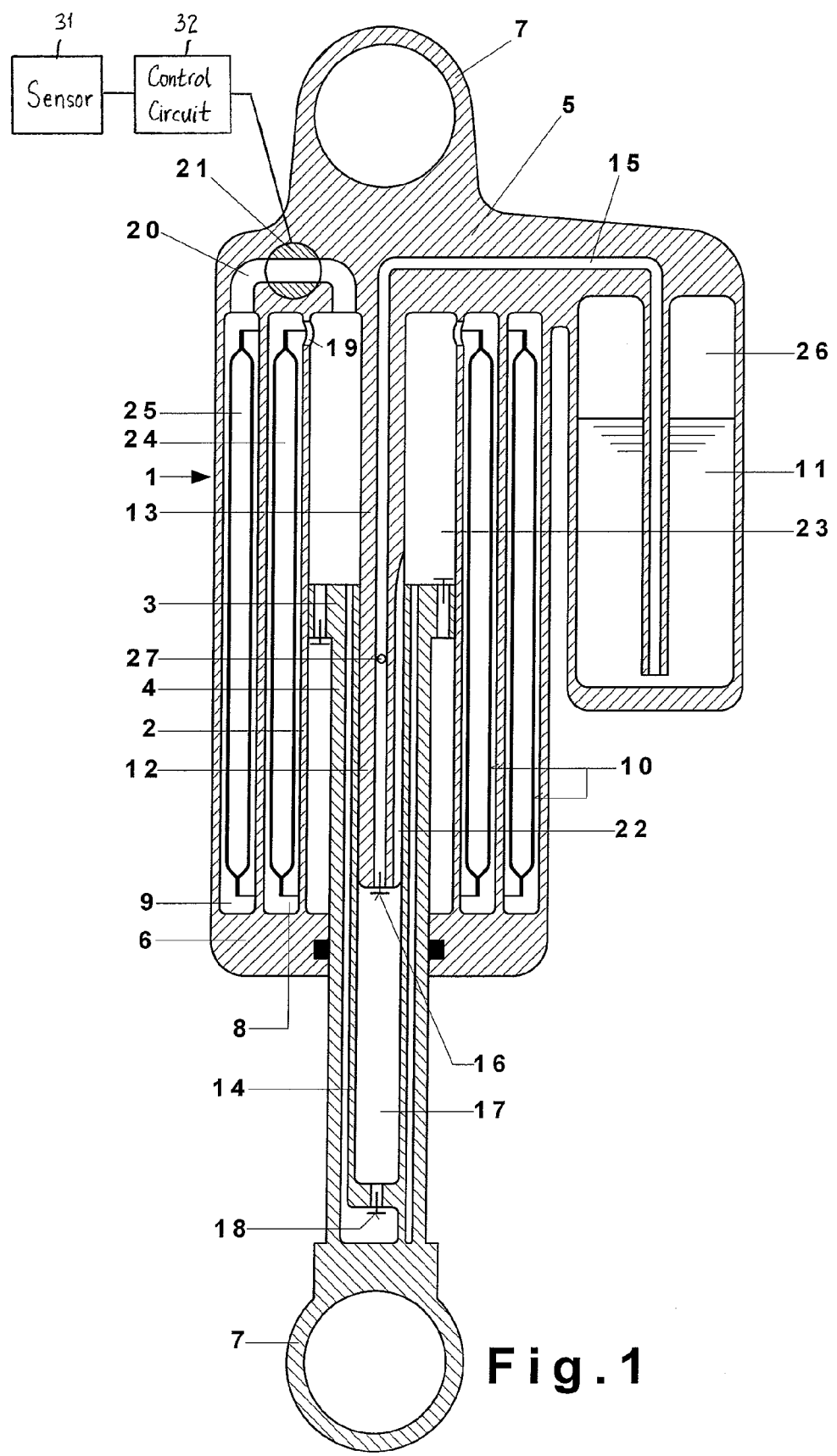
FIG. 1 is a cross sectional view of a self-pumping hydropneumatic spring strut.

The self-pumping hydropneumatic spring strut 1 for motor vehicles, which is shown in FIG. 1, consists essentially of the working cylinder 2, in which a piston 3 arranged at the end of a piston rod 4 slides. The working cylinder 2 is closed at one end by a bottom piece 5 and at the other end by a cover, through which the piston rod 4 extends to the outside in a sealed manner through the piston rod guide 6. The bottom piece 5 is attached by means of a first mounting eye 7 to the body of the vehicle (not shown), and the piston rod 4 is attached by means of a second mounting eye 7 to the axle of the vehicle (also not shown).

The working cylinder 2 is enclosed by two ring-shaped high-pressure chambers 8, 9, which are filled partially with oil and gas. The oil in each chamber 8, 9 is separated from the gas by a separating element 10. In this exemplary embodiment, the gas-tight wall of a gas bag is provided as the separating element 10, but rubber diaphragms, separating pistons, or similar components could also be used.

The oil is not separated from the gas in the low-pressure chamber 11. In the case of a loaded vehicle, the dynamic level height of the vehicle body is achieved in that a piston pump 12, consisting of a pump rod 13 attached to the bottom piece 5 and a pump cylinder 14, which slides over the pump rod 13 and which is connected to the piston rod 4, is put into operation by the excitation caused by irregularities of the road surface. Thus oil is conveyed from the low-pressure chamber 11 though a control channel 15, an inlet valve 16, a pump space 17, and an outlet valve 18 into the working cylinder 2. The volume of oil displaced by the inward-traveling piston rod 4 communicates via the openings 19 in the working cylinder 2 with the inner high-pressure chamber 8 and via a connection 20 with the outer high-pressure chamber 9. The connection 20 shows a shut-off valve 21 in the onened nositi on.

The dynamic level height of the vehicle is reached when the bypass 22 produces a connection between the upper working space 23 and the pump space 17. The short-circuit thus produced renders the piston pump 12 without effect. The gas volumes 24 and 25 of the high-pressure chambers 8 and 9 are precompressed as a function of the degree to which the vehicle is loaded, and they transmit their pressure to the piston rod 4, which in turn holds the body of the vehicle at the desired level.

As a result of the oil volume taken from the low-pressure chamber 11 in order to pump up the pressure, the low-pressure gas 26 has increased in volume and thus lost pressure. The spring performance at the piston rod 4 adjusts itself to the current load state of the vehicle. A vehicle with only a light load is damped with a flat damping force characteristic curve, whereas a fully loaded vehicle is damped with a steeper characteristic curve.

When the vehicle is relieved of its load, the vehicle body first springs upward, so that, by means of the now released control opening 27, the pressure is equalized between the high-pressure chamber and the low-pressure chamber, and the vehicle drops down to the no-load position.

Figure 1A:
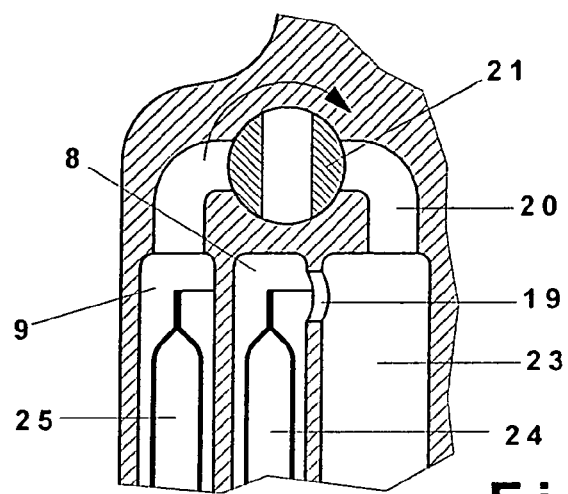
FIGS. 1*a*, 1*b*, and 1*c* are isolated cross sectional views of a shut-off valve between an upper working space and a high-pressure chamber of the spring strut.

FIG. 1a shows the area which connects the upper working space 23 to the inner high-pressure chamber 8 and the outer high-pressure chamber 9. A closed shut-off valve 21 blocks the connection 20, so that the outer gas volume 25 has no practical effect on the spring action of the strut during operation of the vehicle. The only factor which determines the spring action of the strut is now the inner gas volume 24, which is permanently connected via the opening 19 to the upper working space 23. Because of the smaller gas volume 24, the spring characteristic becomes highly progressive in a desirable manner and thus brief but effective use of it can be made in a certain stroke range.

Figure 1B:
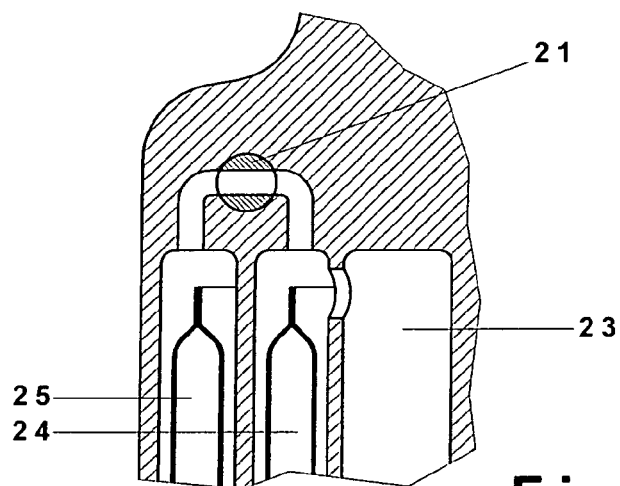

In FIG. 1b, the shut-off valve 21 is open, which means that the outer gas volume 25 and the inner gas volume 24 are both acted upon in parallel and are in working connection with the working space 23.

Figure 1C:
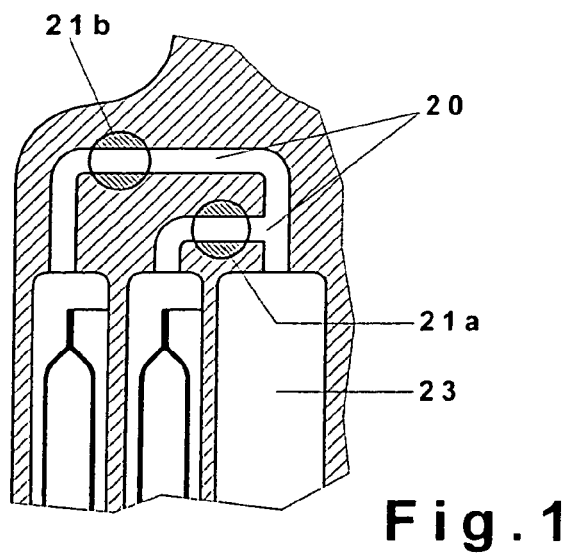

FIG. 1c shows an embodiment in which two connections 20, each proceeding from the working space 23 and each passing through a shut-off valve 21a, 21b, open out into the inner high-pressure chamber 8 and the outer high-pressure chamber 9, respectively. The shut-off valves 21a, 21b can be switched independently of each other.

Figure 1D:
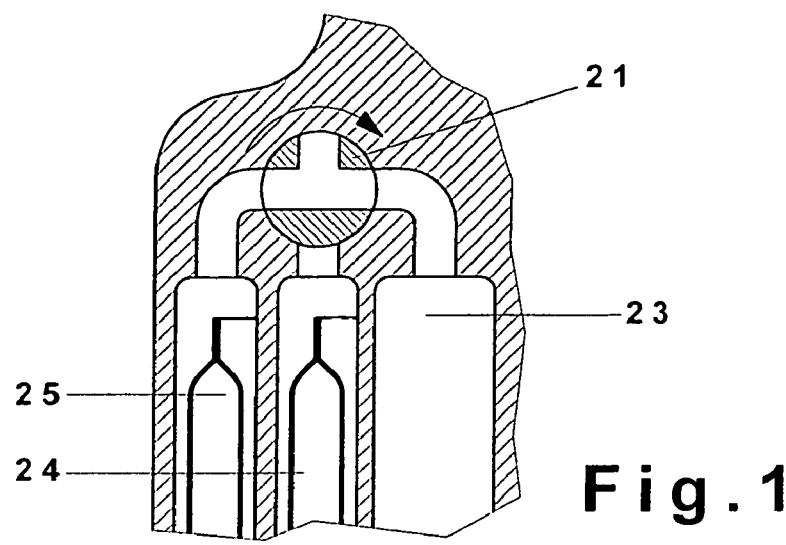
FIGS. 1*d*, 1*e*, and 1*f* are isolated cross sectional views of another embodiment of the shut-off valve.

FIGS. 1d, 1e, and 1f again show the inner gas volume 24 and the outer gas volume 25, wherein the shut-off valve 21 in FIG. 1d is switched in such a way that only the outer gas volume 25 is active.

Figure 1E:
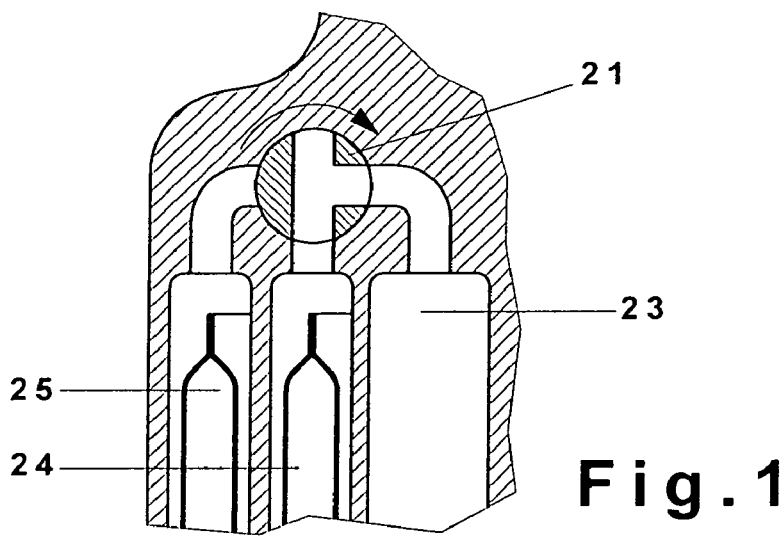

FIG. 1e shows the shut-off valve 21 in a position in which only the inner gas volume 24 is connected to the working space 23. Because the two gas volumes 24, 25 can be made active individually, different gas volumes are available and can be selected as a function of the desired spring characteristic curve.

Figure 1F:
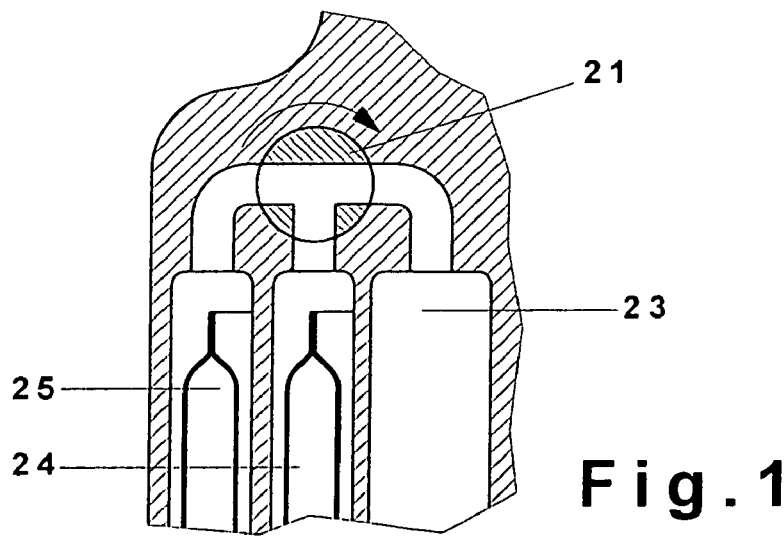

FIG. 1f shows the shut-off valve 21 in a position in which both gas volumes 24 and 25 are active together.

Figure 2:
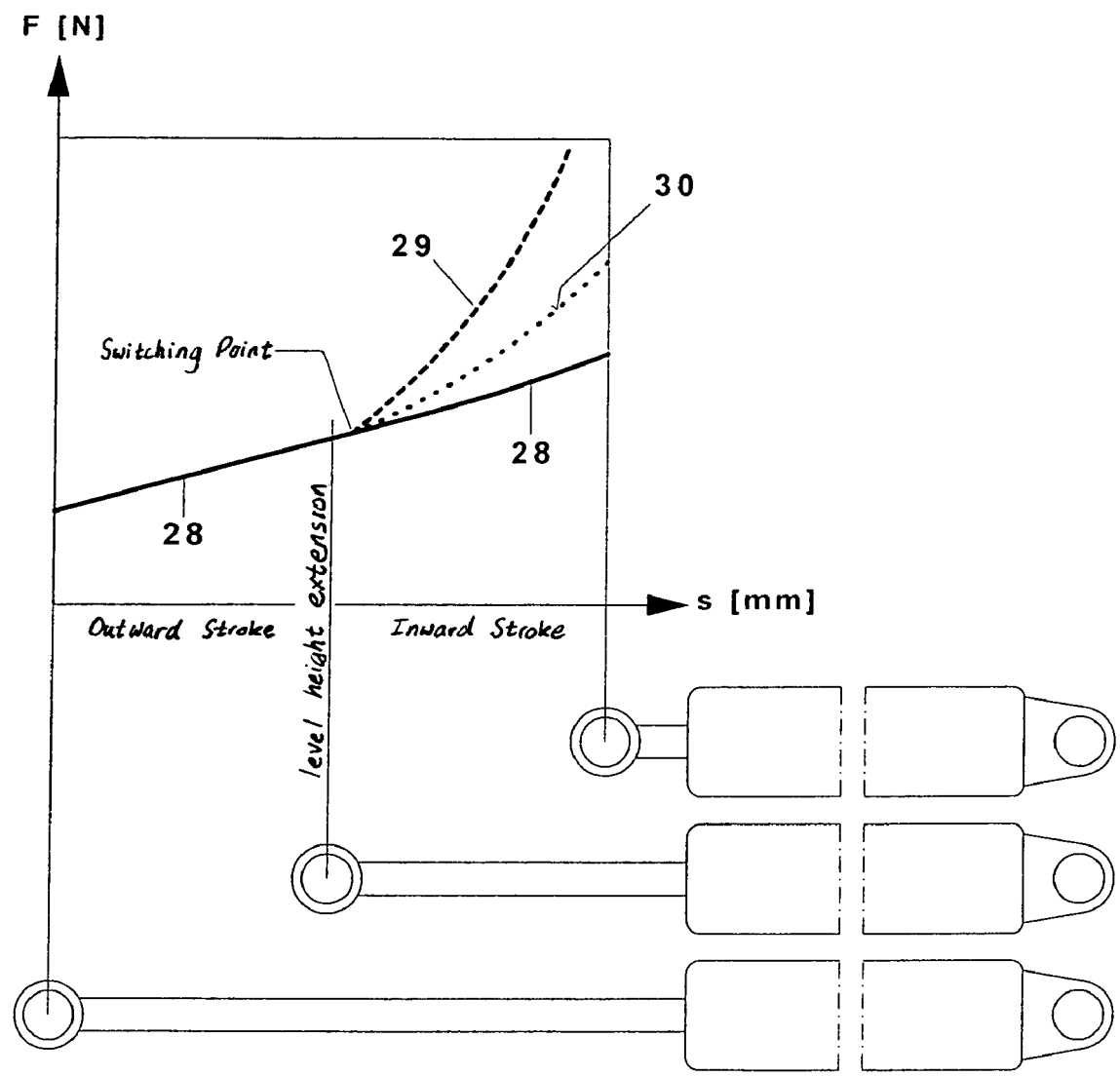
FIG. 2 is a characteristic curve diagram of the damping force of the spring strut of FIG. 1.

FIG. 2 shows a force/distance diagram. The spring characteristic curve 28 in solid line, which represents the situation in which the shut-off valve 21 is open and the vehicle is in a given load state, is "comfortable", that is, relatively soft.

When the vehicle is driven quickly around a curve, a transverse acceleration sensor 31, for example, which is connected to an appropriate electronic circuit 32, can close the shut-off valve 21. This should occur preferably during the course of the inward spring stroke of the spring strut, near the partially extended position of the spring strut determining the dynamic level height of the vehicle. Once this switching point is reached, the stabilizing spring characteristic curve 29 goes into effect and prevents the vehicle body from rocking too severely. By providing gas volumes of different sizes and by connecting one or the other of them to the circuit, it is also possible to achieve intermediate characteristic curves 30 situated between the spring characteristic curves 28 and 29.

It is favorable that, on the return path of the stabilizing spring characteristic curve 29, that is, during the outward spring stroke, the same switching point is used again to open the shut-off valve. The pressure between the high-pressure chamber and the upper working space becomes equalized in the area of the dynamic level height extension of the spring strut, so that, when the shut-off valve 21 is switched, no noticeable force discontinuities occur, which could be unpleasant to the driver.

It is an advantage of this system that due to the load-dependent variation of the spring characteristic curve the supporting force increases in a desirable manner as the load of the vehicle increases.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self pumping hydropneumatic spring strut, comprising:
   an oil-filled working cylinder having a working piston dividing said cylinder into two working spaces and a hollow piston rod carrying said working piston and which is moveable back and forth within the cylinder;
   a first high-pressure chamber comprising a first gas cushion with a first gas volume, and a second high-pressure chamber comprising a second gas cushion with a second gas volume, said first and second high-pressure chambers being arranged in parallel, one of the working spaces being connected to the first high-pressure chamber by an opening and to the second high-pressure chamber by a connection with a shut-off valve such that the first gas cushion and the second gas cushion are both acted on in parallel when the shut-off valve is open
   a piston pump comprising a pump cylinder and a hollow pump rod having a control channel connected to a low-pressure chamber, the pump cylinder being defined by the hollow piston rod, the pump rod having a first end attached to the working cylinder and a second end inserted into the hollow piston rod, the pump rod having an inlet valve arranged at the second end; and
   a control opening connecting the one of the working spaces to the control channel as a function of the position of the working piston in the working cylinder, wherein the piston pump is driven by movements of the piston rod to convey oil from the low-pressure chamber to the one of the working spaces so that the spring strut is extended by the piston pump when said control opening is closed to a partial spring strut extension position at which the control opening opens.

2. The spring strut of claim 1, wherein the shut-off valve is arranged between the first high-pressure chamber and the second high-pressure chamber.

3. The spring strut of claim 1, wherein the shut-off valve is provided between the one of the working spaces and the second high-pressure chamber.

4. The spring strut of claim 3, wherein the shut-off valve is externally controllable.

5. The spring strut of claim 1, wherein at least one of the first and second gas cushions is separated from the oil in the respective one of the first high-pressure chamber and the second high-pressure chamber.

6. The spring strut of claim 1, wherein each of the first and second gas cushions is separated from the oil in the first high-pressure chamber and the second high-pressure chamber.

7. The spring strut of claim 4, wherein the shut-off valve is actuated and switched electronically proximate the partial spring strut extension position or proximate a position in which the piston rod reverses direction.

8. The spring strut of claim 7, wherein the actuation of the shut-off valve occurs in only one of a tension or compression stage.

9. The spring strut of claim 7, wherein the actuation of the shut-off valve occurs in a tension and compression stage.

10. The spring strut of claim 1, wherein the first and second gas cushions are different sizes.

11. The spring strut of claim 2, wherein the shut-off valve is externally controllable.

12. The spring strut of claim 11, wherein the shut-off valve is actuated and switched electronically at a position proximate the partial spring strut extension position or proximate a position in which the piston rod reverses direction.

* * * * *